(12) United States Patent
Klarner

(10) Patent No.: US 8,215,379 B2
(45) Date of Patent: Jul. 10, 2012

(54) FEEDWATER DEBRIS TRAP

(75) Inventor: Richard G. Klarner, Georgetown (CA)

(73) Assignee: Babcock & Wilcox Canada Ltd.

( * ) Notice: Subject to any disclaimer, the term of this patent is extended or adjusted under 35 U.S.C. 154(b) by 593 days.

(21) Appl. No.: 12/432,653

(22) Filed: Apr. 29, 2009

(65) Prior Publication Data

US 2010/0276124 A1 Nov. 4, 2010

(51) Int. Cl.
*F28F 13/12* (2006.01)
*F22G 3/00* (2006.01)
*F02B 7/00* (2006.01)

(52) U.S. Cl. ............... 165/119; 122/459; 122/431

(58) Field of Classification Search ............ 165/119, 165/151; 122/429, 431, 459
See application file for complete search history.

(56) References Cited

U.S. PATENT DOCUMENTS

| | | | | |
|---|---|---|---|---|
| 3,315,737 A * | 4/1967 | Welch | ............ | 165/119 |
| 3,547,084 A * | 12/1970 | Sprague | ............ | 122/32 |
| 3,771,497 A * | 11/1973 | Sprague et al. | ............ | 122/32 |
| 3,822,018 A * | 7/1974 | Krongos | ............ | 210/323.2 |
| 3,942,481 A * | 3/1976 | Bennett | ............ | 122/32 |
| 4,158,387 A * | 6/1979 | McDonald | ............ | 165/71 |
| 4,526,689 A * | 7/1985 | Morgan | ............ | 210/323.2 |
| 2007/0045173 A1* | 3/2007 | Zimmerman et al. | ............ | 210/450 |

* cited by examiner

*Primary Examiner* — Ljiljana Ciric
*Assistant Examiner* — Jason Thompson
(74) *Attorney, Agent, or Firm* — Robert J. Edwards; Eric Marich

(57) ABSTRACT

A debris filter trap to prevent potentially damaging debris carried by the feedwater entering the pressure vessel of a once through steam generator from entering into the section of tubes which are positioned within the confines of an integrally contained economizer of the once through steam generator. The trap will remove foreign material, from the feedwater flow, that is larger than the space between the tubes, and thus prevent debris particles that are large enough to get lodged in the tube spacing from entering the economizer.

7 Claims, 4 Drawing Sheets

FEEDWATER DEBRIS TRAP

FIELD AND BACKGROUND OF INVENTION

The present invention relates generally to once through steam generators for nuclear power plants, and in particular to a trap for preventing feedwater debris from entering the space between the section of tubes positioned in the economizer which is integrally contained in the steam generator pressure vessel.

The pressurized steam generators, or heat exchangers, associated with nuclear power stations transfer the reactor-produced heat from the primary coolant to the secondary coolant, which in turn drives the plant turbines. Many of these steam generator pressure vessels have integral economizers wherein subcooled feedwater is directly channeled into the lower section of the tube bundle. The pressure vessels may about 75 feet long and have an outside diameter of about 12 feet. Within one of these steam generator pressure vessels, straight tubes, through which the primary coolant flows, may be typically ⅝ inch in outside diameter, but have an effective length of 52 feet or longer between the tube-end mountings and the opposing faces of the tubesheets. Typically, there may be a bundle of more than 15,000 tubes in one of these steam generator vessels. Debris from the feedwater system, transported by the feedwater flow, can become lodged between the tubes of the tube bundle and cause wearing and/or denting of the tubes.

While steam generator pressure vessels having integral economizers are known, as exemplified by U.S. Pat. No. 3,356,135 issued to Robert. K. Sayre; U.S. Pat. No. 3,547,084 issued to Theodore S. Sprague; and U.S. Pat. No. 3,771,497 issued to Theodore Sprague et al.; none of these prior art patents provide a debris trap within the steam generator pressure vessel to capture and prevent debris carried by the feedwater from entering the economizer tube section.

For a general description of the characteristics of nuclear steam generators, the reader is referred to Chapter 48 of *Steam/its generation and use,* 41st Edition, Kitto and Stultz, Eds., © 2005 The Babcock & Wilcox Company, Barberton, Ohio, U.S.A., the text of which is hereby incorporated by reference as though fully set forth herein.

SUMMARY OF INVENTION

The present invention is drawn to a vapor generator having a pressure vessel and a plurality of heat exchanger tubes extending within the vessel to accommodate the flow therethrough of a hot primary fluid. An economizer is disposed within the vessel in spaced-apart relation thereto to define an annular downcomer passage and a lower portion of the tube bundle enclosed by the downcomer. The economizer portion of the heat exchange surface of the tubes preheats feedwater fluid by heat transfer from the tubes. A debris filter trap is provided for capturing and retaining debris carried by the feedwater fluid to prevent entry of the debris into the economizer.

The debris filter trap is located in the downcomer passage. An annular ring supports the filter trap and spans the cross section of the downcomer passage. The support ring has a plurality of openings, preferably equispaced about the circumference of the ring. The debris filter trap includes an organized array of elongated cylindrical filter tubes, each of which has an open bottom and a closed top. The open bottom of each filter tube is secured to the annular support ring and covers a corresponding opening in the ring. The generally cylindrical portion of the filter tube has a plurality of radially oriented holes formed therein. The filter holes are sized to remove foreign material from the secondary fluid flow, when the material is larger than the space between the tubes positioned in the economizer.

The annular support ring is attached to both the economizer and the pressure vessel, or at least to one of them. If the annular support ring is only attached to the economizer or the pressure vessel, then the gap between the free edge of the annular ring and either the economizer or the pressure vessel, must be of the same or lesser width than the width of a filter tube hole, to ensure that debris which is larger than the filter tube hole cannot migrate through the gap at the free edge of the annular support ring.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numbers are used to refer to the same or functionally similar elements.

DESCRIPTION OF THE PREFERRED EMBODIMENTS

Figure 1:
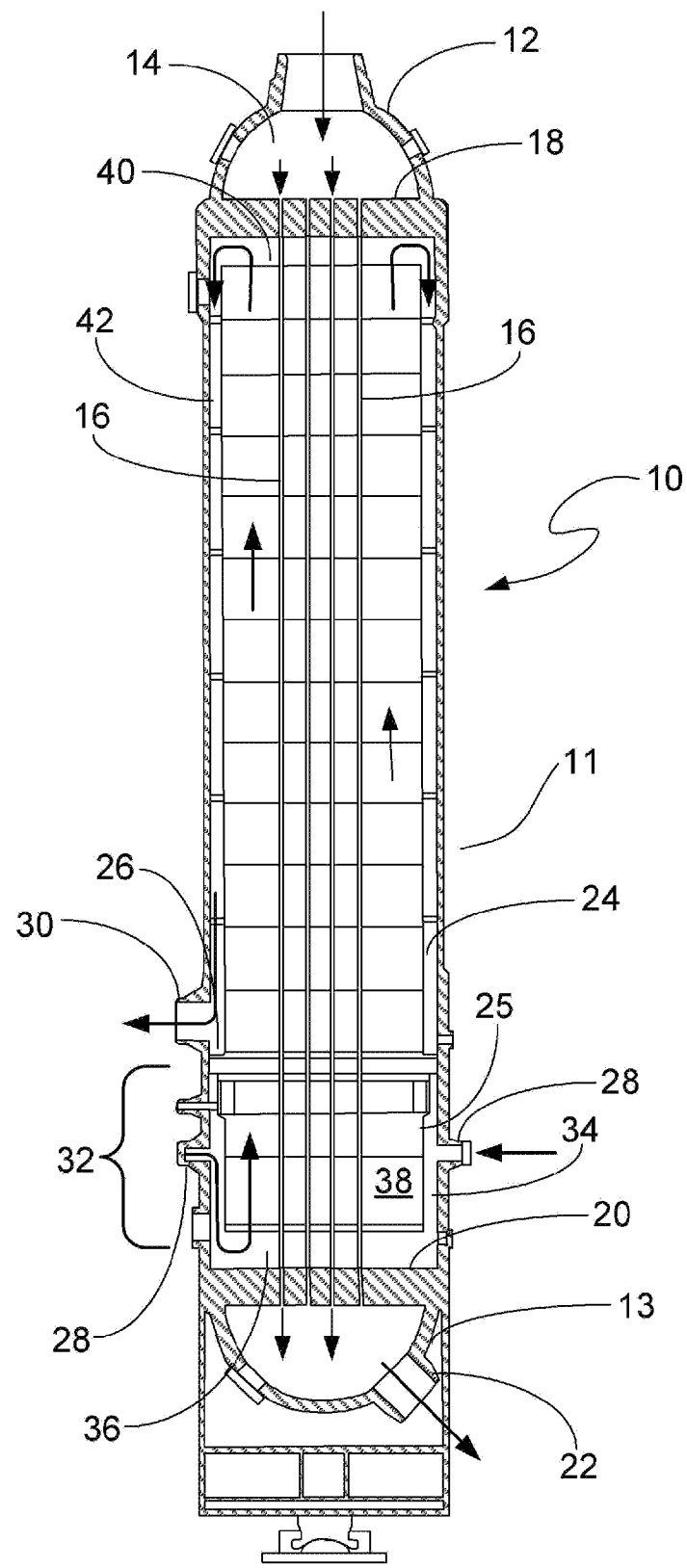
FIG. 1 is a sectional side view of a prior art once-through steam generator whereon the principles of the present invention may be practiced.

FIG. 1 depicts a prior art once-through steam generator 10 comprising a vertically elongated, generally cylindrical pressure vessel or shell 11 closed at its opposite ends by an upper head 12 and a lower head 13. A hot primary fluid such as the coolant from a nuclear reactor (not shown) is passed through the pressure vessel 11, and therein undergoes indirect heat exchange with a secondary fluid, such as water, fed into the pressure vessel 11. The primary fluid enters a plenum chamber 14 at the upper head 12 of the pressure vessel 11 and passes through tubes 16, received in upper and lower tubesheets 18 and 20, whence it exits through the coolant outlet nozzle 22 for recirculation to the reactor.

Within the pressure vessel 11 there is an upper shroud 24 and a lower shroud 25, both are open ended and surround the bundle of tubes 16. An annular ring plate 26, connected at its inner edge to the upper shroud 24 and at its outer edge to the inner wall of pressure vessel 11, serves to separate incoming feedwater introduced through two feedwater inlet nozzles 28 from the outgoing steam exiting through two steam outlet nozzles 30.

The lower shroud 25 is designed to serve as an integrally contained economizer section 32, and is positioned in spaced-apart relation to the pressure vessel 11 so as to define therewith an annular downcomer passage 34, which is positioned in spaced-apart relation to the lower tubesheet 20 to define therewith a flow space 36 that is in communication with the bottom of economizer chamber 38. The economizer section 32 encloses a portion of the heat exchange surface of the tubes 16.

The feedwater entering the pressure vessel 11 through the feedwater inlet nozzles 28 is constrained by ring plate 26 to flow downward through the annular downcomer passage 34 and thence through the flow space 36 and into and through the economizer chamber 38, where it is preheated by heat transferred from the hotter primary fluid flowing through the tubes 16 in that portion of the heat exchange surface lying within chamber 38. The feedwater thus absorbs heat in flowing through economizer chamber 38. The heated feedwater exiting the chamber 38 is vaporized by heat transfer through tubes 16 from the hot primary fluid. Moreover, this steam is superheated before it reaches the top of the tubes 16. The superheated steam thus produced passes out through the open upper end 40 of the upper shroud 24, and flows down the annular passage 42, between the upper shroud 24 and the inner wall of pressure vessel 11, and above the annular ring plate 26, for exit through the steam outlet nozzle 30.

Figure 2:
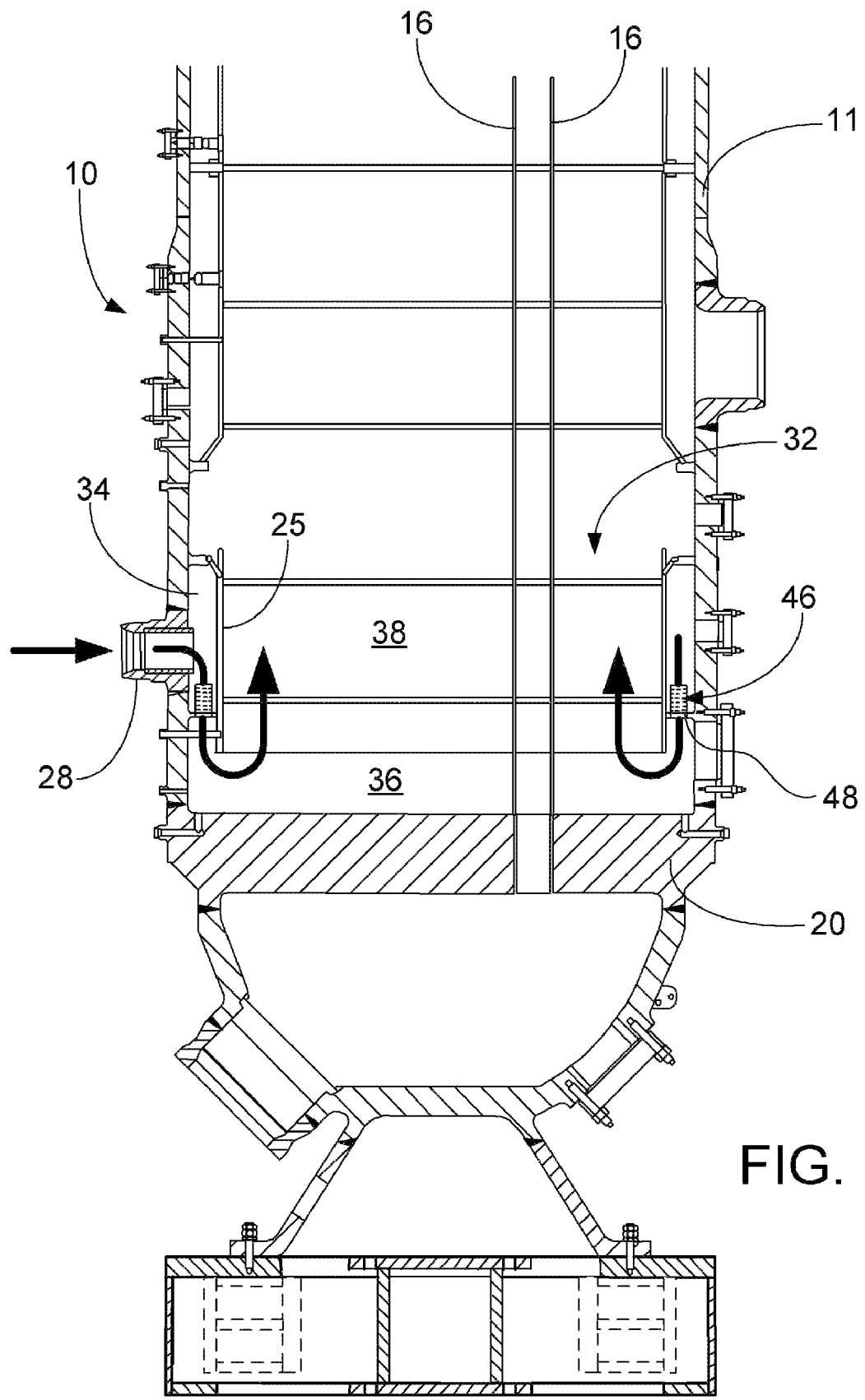
FIG. 2 is a sectional side view of the lower section of a once through steam generator which incorporates the debris trap of the present invention.
Figure 3:
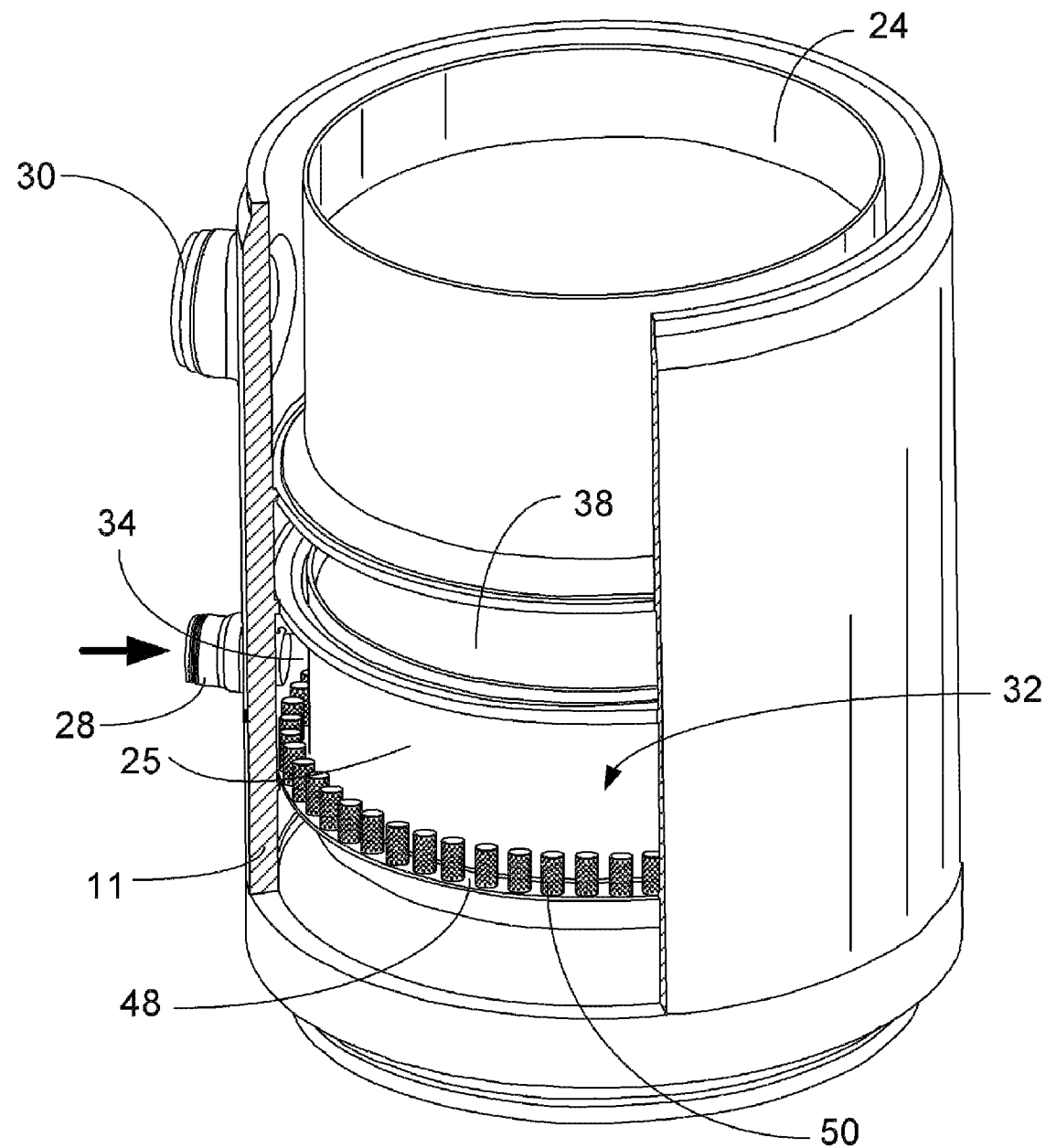
FIG. 3 is a perspective view of the once through steam generator lower section shown in FIG. 2.
Figure 4:
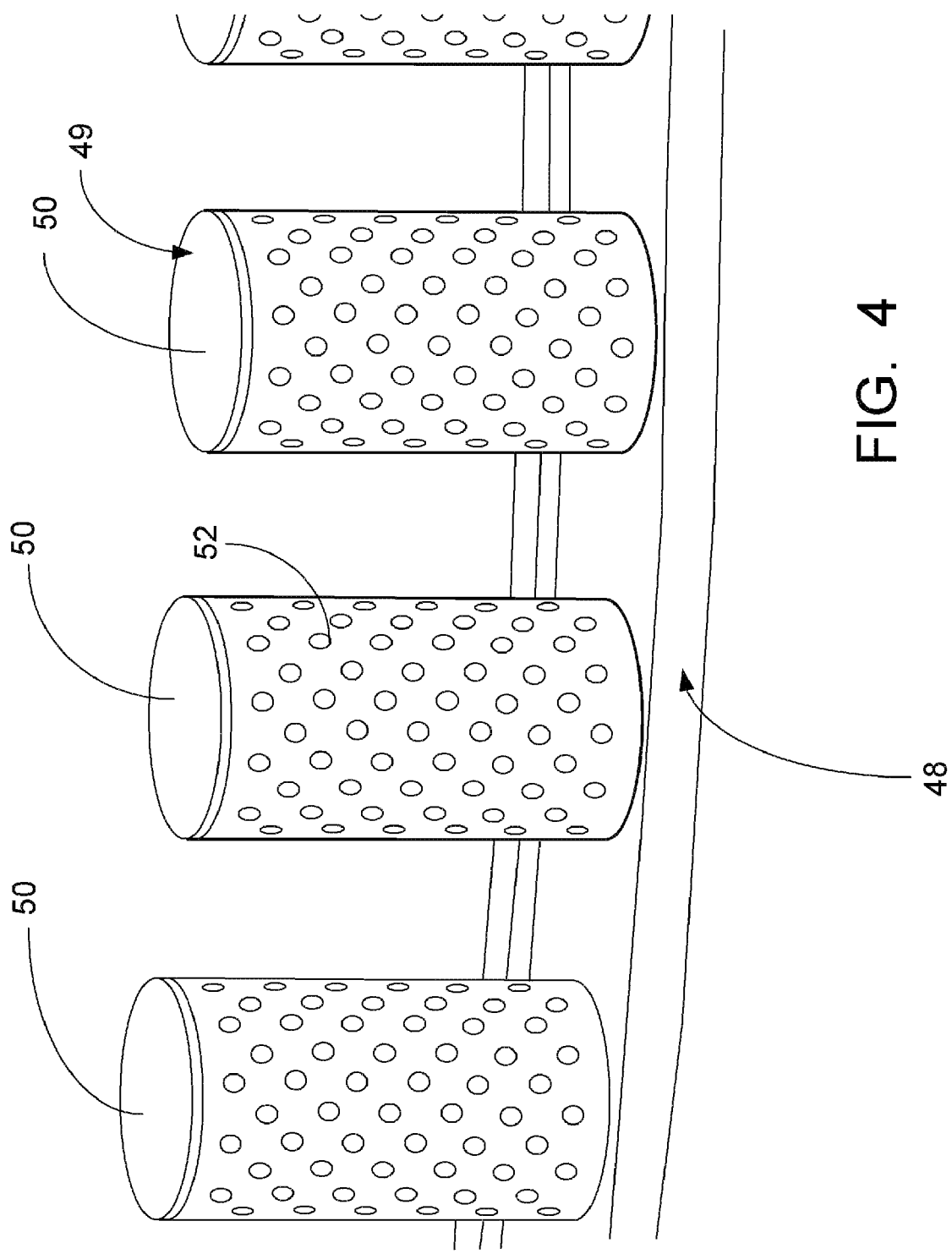
FIG. 4 is a perspective view of the filter tubes associated with the filter trap of the present invention.

Referring in general to FIG. 1, and in particular to FIGS. 2-4, there is shown a debris trap 46 to prevent potentially damaging debris carried by the feedwater entering the pressure vessel 11 from entering into the section of tubes 16 which is positioned within the confines of the integrally contained economizer 32 of the once through steam generator 10. The debris trap 46 will remove foreign material from the feedwater flow that is larger than the space between the tubes 16, and thus prevent debris particles that are large enough to get lodged in the space between the tubes 16 from entering the economizer 32. Debris that is lodged between the tubes 16 can cause wearing and/or denting of the tubes.

The debris trap 46 is located near the bottom of the annular downcomer passage 34. The feedwater which enters the pressure vessel 11 through the inlet nozzles 28 is forced to flow through the debris trap 46 before discharge to the flow space 36 and entry to the section of tubes 16 positioned in the economizer chamber 38.

The debris trap 46 is comprised of an annular support ring 48 which spans across the downcomer passage 34 between the wall of the economizer 32 as defined by lower shroud 25 and the inner wall of the pressure vessel 11, and is located near the lower end of the shroud 25. The annular support ring 48 is a plate which supports an organized array of filter tubes 50, preferably circumferentially equispaced about the support ring 48, with each of the filter tubes 50 having a plurality of radially oriented holes 52 formed in the cylindrical tube wall. The bottom ends of the filter tubes 50 are open and aligned with corresponding openings or holes (not shown), extending through the annular support ring 48. The top end 49 of each filter tube 50 is sealed so that the downcomer feedwater flow is forced to flow through the filter tube holes 52.

The debris trap support ring 48 is attached to at least one of either the pressure vessel 11 inner wall or the economizer wall as defined by the lower shroud 25. If the annular support ring 48 is attached only to the pressure vessel 11 or to the economizer 32, then the gap, on the free edge of the support ring 48, must be kept at the same or lesser width than the width of the filter tube holes 52. This will ensure that debris which is larger than the filter tube holes 52 cannot migrate through gaps around the annular support ring 48.

The pressure drop across the feedwater debris trap 46 is minimized to reduce feedwater pumping power and to reduce structural loads on the debris trap. A low pressure drop is achieved by maximizing the number of filter tubes 50 and the number of holes 52 per filter tube. Also, the individual filter tube holes 52 can be profiled to have a tapered inlet geometry to further minimize the pressure drop.

Advantages of the invention include:

The feedwater debris trap 46 prevents foreign objects that are large enough to be lodged between the tubes 16 positioned in the integral economizer section 32, thereby minimizing the risk of tube wear and damage.

The lowest row of holes 52 on the filter tube 50 can be positioned far enough above the elevation of the annular support ring 48 so that the debris which is screened by the filter tube 50 could ultimately rest on top of the support ring 48 below the elevation of the filter holes 52. This minimizes the risk that debris would damage the holes 52 in the filter tube 50.

Access to the top side of the annular support ring 48 and the filter tubes 50, for inspection and potential removal of debris, can be had through one or more handholes provided through the wall of pressure vessel 11.

The filter tube 50 can be fabricated from erosion and corrosion resistant steel which would protect the filter tube 50 from degradation during service.

The cylindrical design of the filter tube 50 maximizes the structural strength of the filter tube, since pressure loads, such as those that may be experienced during a hypothesized burst feed line event, result in membrane stresses and minimal bending stresses in the filter tube 50. Because of its cylindrical design, the filter tube 50 is capable of withstanding large pressure loads.

While specific embodiments and/or details of the invention have been shown and described above to illustrate the application of the principles of the invention, it is understood that this invention may be embodied as more fully described in the claims, or as otherwise known by those skilled in the art, including any and all equivalents, without departing from such principles.

I claim:

1. An improved vapor generator having a pressure vessel, a plurality of heat exchanger tubes extending within the pressure vessel, the heat exchanger tubes adapted to accommodate a flow therethrough of a hot primary fluid, the heat exchanger tubes having heat exchanger surfaces, an economizer disposed within the pressure vessel, the economizer being spaced-apart from the pressure vessel to provide an annular downcomer passage, the economizer enclosing a portion of the heat exchanger surfaces of the tubes to preheat feedwater flow introduced into the economizer, the improvement comprising:

an annular support ring disposed within the annular downcomer passage, the annular support ring having a plurality of openings circumferentially spaced about the annular ring for conveying feedwater therethrough, and a plurality of elongated cylindrical tube filters each having a closed top end, an open bottom end covering and corresponding to each of the plurality of openings, and a plurality of filter holes perforating the cylindrical portion of each of the cylindrical tube filters for capturing and retaining debris carried by the feedwater fluid before it passes into the economizer to prevent entry of the debris into the economizer.

2. The improved vapor generator of claim 1, wherein the plurality of filter holes perforating each of the cylindrical tube filters are radially oriented and profiled with a tapered inlet geometry to reduce feedwater flow pressure drop.

3. The improved vapor generator of claim 1, wherein the plurality of filter holes are sized to remove foreign material from the feedwater fluid flow that is larger than the space between the tubes positioned in the economizer.

4. The improved vapor generator of claim 1, wherein the annular support ring is attached to the economizer and the pressure vessel.

5. The improved vapor generator of claim 1, wherein the annular support ring is attached either to the economizer or to the pressure vessel.

6. The improved vapor generator of claim 1, wherein a free side of the annular support ring is spaced from either the economizer or the pressure vessel a distance equal to or less than a width of a perforation in said perforated tube filters.

7. The improved vapor generator of claim 1, wherein the annular support ring spanning a cross section of the annular downcomer passage is located near a bottom region of the annular downcomer passage.

* * * * *